United States Patent
Amann et al.

(10) Patent No.: US 7,173,635 B2
(45) Date of Patent: Feb. 6, 2007

(54) REMOTE GRAPHICAL USER INTERFACE SUPPORT USING A GRAPHICS PROCESSING UNIT

(75) Inventors: Garry W. Amann, Austin, TX (US); Hassane S. Azar, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 176 days.

(21) Appl. No.: 10/400,046

(22) Filed: Mar. 25, 2003

(65) Prior Publication Data

US 2004/0189677 A1    Sep. 30, 2004

(51) Int. Cl.
*G09G 5/00* (2006.01)
*G06F 15/16* (2006.01)

(52) U.S. Cl. .................. 345/660; 345/503

(58) Field of Classification Search ......... 345/660, 345/554, 503, 581, 473, 546
See application file for complete search history.

(56) References Cited

U.S. PATENT DOCUMENTS

| | | | |
|---|---|---|---|
| 6,028,586 A * | 2/2000 | Swan et al. .............. 345/581 |
| 6,331,856 B1 * | 12/2001 | Van Hook et al. ......... 345/503 |
| 6,700,586 B1 * | 3/2004 | Demers .................. 345/588 |
| 6,704,021 B1 * | 3/2004 | Rogers et al. ............ 345/543 |
| 6,708,217 B1 * | 3/2004 | Colson et al. ............ 709/231 |
| 6,714,200 B1 * | 3/2004 | Talnykin et al. .......... 345/473 |
| 6,798,420 B1 * | 9/2004 | Xie ...................... 345/554 |
| 6,937,245 B1 * | 8/2005 | Van Hook et al. ......... 345/546 |

* cited by examiner

*Primary Examiner*—Kee M. Tung
*Assistant Examiner*—Jin-Cheng Wang
(74) *Attorney, Agent, or Firm*—Patterson & Sheridan, L.L.P.

(57) ABSTRACT

Methods, apparatus and systems for the display, on a remote node, of a three-dimensional (3D) image rendered on a host system in a first image format are described. In general, the 3D image is transformed into a second image format that is compressed (i.e., uses fewer data bits per pixel) relative to the first image format, (optionally) scaled to a screen size of remote node, and subsequently transferred to remote node for display. In instances, the transformation of the image from the first image format to the second image format and the optional scaling of the image to the screen size of remote node may be done in a graphics processing unit (GPU) on the host system. As an example, the first image format may be an RGB-based format, such as RGBA (32-bits per pixel) or standard RGB (24-bits per pixel) and the second image format may be a YUV-based format, such as YV12 (12-bits per pixel).

29 Claims, 7 Drawing Sheets

REMOTE GRAPHICAL USER INTERFACE SUPPORT USING A GRAPHICS PROCESSING UNIT

BACKGROUND OF THE INVENTION

1. Field of the Invention

One or more aspects of the invention generally relate to computer graphics and, more particularly, to remote graphical user interfaces (GUIs).

2. Description of the Related Art

Three-dimensional (3D) computer graphics conventionally involves generating 3D scenes on a two-dimensional (2D) computer screen. In a 3D animation, a sequence of images is displayed, giving the appearance of motion in three-dimensional space. Interactive 3D computer graphics allows a user to change viewpoint or geometry in real-time, thereby requiring the graphics system to create new images. Conventionally, the higher the number of images that are displayed per second, commonly referred to as the frame rate, the smoother the animation will appear but the more processing power and system bandwidth is required. For example, the human eye may detect new images coming onto the screen at frame rates less than 30 frames per second (fps). Several factors may affect the actual frame rate on a computer graphics system, such as the number of pixels on the screen. Generally, higher frame rates are possible with a fewer number of pixels, but visually perceptible image quality may suffer.

While the number of pixels and frame rate is important in determining graphics system performance, visual quality of the image generated may be equally important. As an example, an image on a 2D screen with high pixel density may appear unrealistic if resolution of the image is not high enough to represent a smooth curve, jagged lines may appear in the image. Processing techniques, such as smoothing and anti-aliasing techniques, can reduce the effect of jagged lines and aliasing. As another example, an image may appear unrealistic if all the objects appearing in the scene are in focus. The unrealistic appearance is due to an incorrect (or lack of) depth-of-field effect of the image. Depth of field generally refers to the distance range (i.e., an in-focus range) from a viewpoint within which objects in an image look sharp. In general, depth-of-field corrections attempt to blur objects or areas of an image that are either closer or farther away from a particular focal point.

The generation of 3D computer graphics, particularly if advanced 3D imaging techniques, such as anti-aliasing and depth-of-field corrections are involved, involves mathematically-intensive tasks which require a significant amount of computer processing power. To offload some of this burden from the central processing unit (CPU), some computer systems may include a graphics processing unit (GPU) dedicated to performing these tasks. On systems with GPUs, the generation of 3D graphics is typically accomplished in two major stages: geometry and rendering. The geometry stage, typically performed by the CPU, handles all polygon activity and converts 3D spatial data into pixels. The rendering stage, typically handled by the GPU, performs operations on the pixels, preparing them for display 3D image processing techniques, such as anti-aliasing and depth-of-field corrections.

For various applications, it may be desirable to display a high quality 3D image one on or more remote systems connected to a host system. For example, in a gaming environment, multiple users may interact via remotely located nodes (e.g., gaming consoles) connected via a common game server. As another example, multiple users at remote nodes (e.g, set-top box like devices) may wish to view content (e.g., a DVD movie) from a common media server.

One approach to display a high quality 3D image at such remote nodes is to render the 3D image on the host system and send the rendered image to remote node for display. In other words, remote nodes do not have to perform 3D processing and may, therefore, be configured with relatively limited resources required to receive and display the rendered image, which may be desirable to help control costs. However, network bandwidth required to transmit a high quality 3D image at an acceptable frame rate is not widely available, and any such network bandwidth is further consumed where multiple remote nodes are involved.

Another approach that may be used in an effort to reduce the required network bandwidth, is to transmit, from the host system to remote nodes, a limited amount of information necessary for remote node to render the 3D image, rather than the entire rendered 3D image. For example, the host system may send a remote node a data object describing the 3D image as a list of objects (e.g., stored on remote node) to be used in generating the 3D image. The remote node may then render the 3D image, using the stored objects, based on the information received. However, this approach significantly increases the resources required by remote node (e.g., sufficient storage for the image objects, sufficient processing power and memory to render the 3D image, etc.), which may significantly increase the cost of remote node.

Accordingly, a need exists for improved methods, apparatus, and systems for displaying high quality computer-generated 3D images on remote systems.

SUMMARY

The invention generally provides methods, apparatus, and systems for displaying computer-generated images, such as three-dimensional (3D) computer-generated images, on a remote device.

An aspect of the invention generally includes a method for preparing a computer-generated image for display on a remote device. The method generally includes rendering the image in a first image format, transforming, with a graphics processing unit, the rendered image into a second image format, the second image format utilizing fewer data bits per pixel than the first image format, and sending the transformed image to the remote device. According to some aspects, the operations may be performed to prepare a plurality of the computer-generated images on a plurality of remote devices.

Another aspect of the invention generally includes a method for preparing, by a host system, one or more computer-generated images for display on one or more remote devices. The method generally includes (a) receiving a frame rate and screen size corresponding to at least one of the remote devices, (b) transforming, with a graphics processing unit, a rendered image from a first image format to a second image format, wherein the second image format utilizes fewer data bits per pixel than the first image format, (c) scaling the rendered image from an initial size to the screen size, (d) sending the scaled and transformed image to the at least one remote device for display, (e) repeating the operations of (b)–(d) to send scaled and transformed images to the at least one remote device at a frequency corresponding to the frame rate.

Another aspect of the invention generally includes a graphics processing unit for preparing a rendered three-dimensional (3D) computer-generated image for display including a shader unit configured to capture the rendered image as texture data in a first image format and, based on the captured texture data, transform the rendered image into a second image format, wherein the second image format utilizes fewer data bits per pixel than the first image format.

Another aspect of the invention generally includes a computer-readable medium containing a program which, when executed by a processor, performs operations for preparing a plurality of computer-generated images for display on one or more remote devices. The operations generally include rendering the images in a first image format, transforming, with a graphics processing unit, the rendered images into a second image format, the second image format utilizing fewer data bits per pixel than the first image format, and sending the transformed images to the remote devices.

Another aspect of the invention generally includes a system including one or more remote devices, each having a corresponding display device, and a host computer system coupled to the one or more remote devices via a network. The host computer generally includes a processor, a graphics processing unit, and a storage medium containing a program. When executed by the processor, the program performs operations for preparing a plurality of computer-generated images for display on the remote devices. The operations generally include rendering the images in a first image format, transforming, with the graphics processing unit, the rendered images into a second image format utilizing fewer data bits per pixel than the first image format, and sending the transformed images to the remote devices via network.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
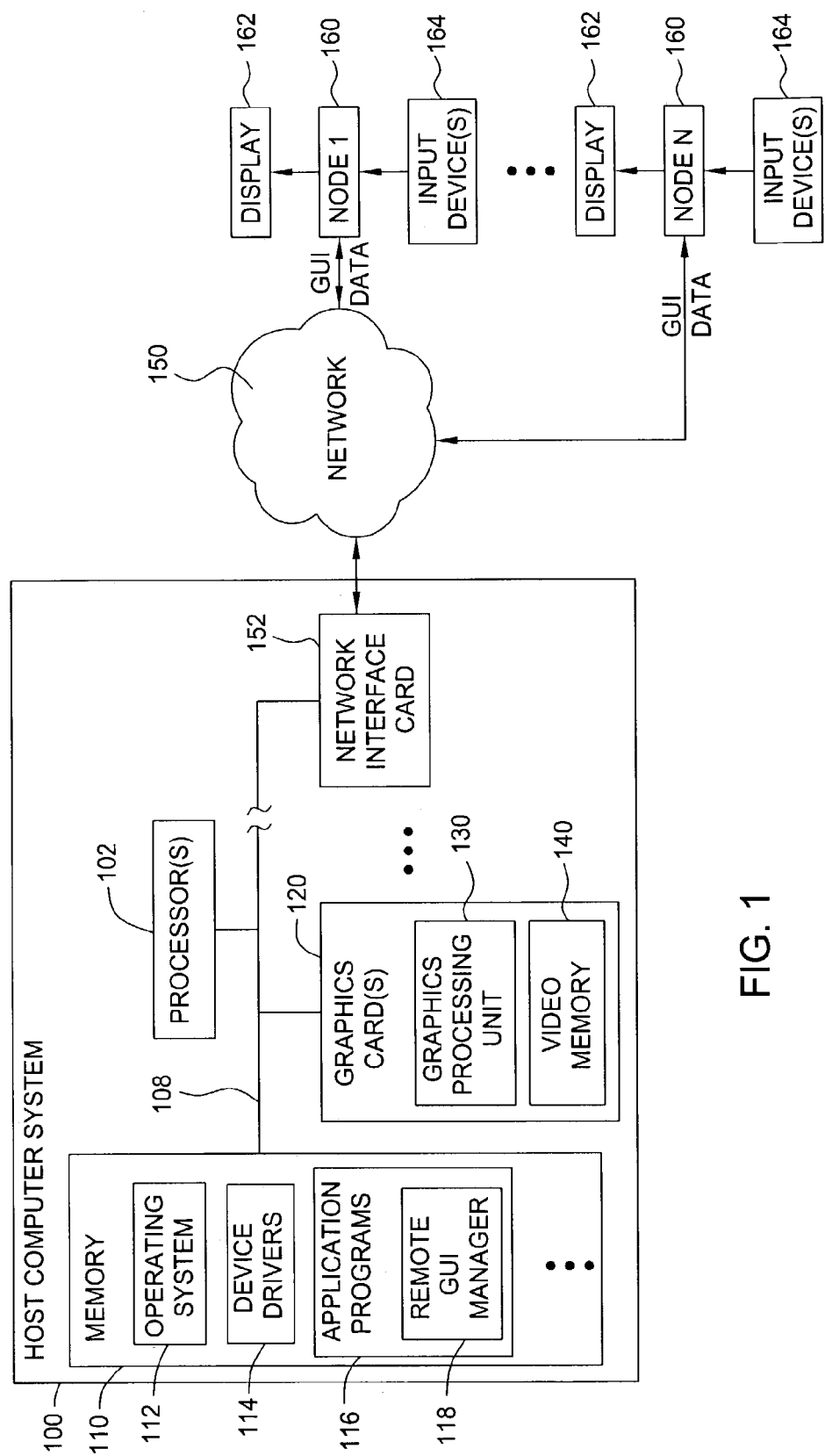
FIG. 1 is a computer system in which one or more aspects of the invention may be used.

The display, on a remote node, of a three-dimensional (3D) image rendered on a host system in a first image format is described. In general, the 3D image is transformed into a second image format that is compressed (i.e., uses fewer data bits per pixel) relative to the first image format, (optionally) scaled to a screen size of remote node, and subsequently transferred to a remote node for display.

As an example, the first image format may be an RGB-based format, such as RGBA (32-bits per pixel) or standard RGB (24-bits per pixel) and the second image format may be a YUV-based format, such as YV12 (12-bits per pixel). Transformation of the image from the first image format to the second image format, as well as scaling of the image to the screen size of the remote node may be done in a graphics processing unit (GPU) on the host system. As used herein, the term RGB generally refers to an image format that uses three separate components, red (R), green (G), and blue (B), to represent a color for each pixel in an image, while the term YUV generally refers to an image format that utilizes one component (Y) to represent luma and two components (U and V) to represent color information for each pixel in an image.

Regardless of the particular image formats, however, because the 3D image is rendered on the host system, it may be displayed on a remote node having relatively limited resources and which may, thus, be produced relatively inexpensively. In other words, the host system may perform complex 3D processing (e.g., anti-aliasing and depth-of-field effects, among other known 3D processing) that would require a significant amount of resources (e.g., CPU, GPU, and memory) on remote node, which would significantly increase the cost of remote node. In addition to reducing the complexity and cost of a remote node, transforming the image into the second image format may achieve an amount of compression that may reduce network bandwidth required to send the image to remote node. For example, if the first image format is RGB32 and the second image format is YV12, a compression ratio of 8 to 3 may be achieved. Further, scaling the image to fit the screen size of a remote node may result in additional compression. For example, the image may initially be 1280×1024 pixels and may be scaled to fit a 720×480 screen size of a remote node, resulting in an additional compression of approximately 3.8 to 1.

Aspects of the invention may be described below with reference to processing and displaying of 3D computer-generated images. It should be noted, however, that 3D computer-generated images are just one specific, non-limiting, example of a type of computer-generated image that may be advantageously processed and displayed according to aspects of the invention. Aspects of the invention may be utilized to an advantage to display any type of computer-generated image on a remote system, particularly those that require significant resources (CPUs, GPUs, memory, etc.) for processing.

AN EXEMPLARY ENVIRONMENT

Aspects of the invention may be implemented as a program product for use with a computer system such as, for example, a networked computer system shown in FIG. 1, including a host computer system 100 (hereinafter "host 100") and one or more remote nodes 160. Host 100 may represent any type of computer system (e.g, network server, media server, home network server, or any other suitable type computer system capable of performing the functions described herein. Remote nodes 160 may be any suitable networked devices capable of receiving and displaying a graphical image from host 100.

The program product may include a program which, when executed by one or more processors 102, performs functions according to aspects of the invention (including the methods described herein). The program product can be contained on a variety of signal-bearing media, including, but not limited to, non-writable storage media (e.g., read-only memory devices, such as CD-ROM disks), alterable information stored on writable storage media (e.g., floppy disks, CD-R/W disks), or information conveyed to a computer by a communications medium, such as a computer network, telephone network, or wireless network, including the Internet.

As illustrated, host 100 may also include one or more graphics cards 120 which typically include at least one graphics processing unit (GPU) 130 and video memory 140. Of course, GPU 130 and video memory 140 need not necessarily be part of a graphics card 120 and may, for example, be integrated into a motherboard. Further, video memory 140 may be an allocated portion of another memory system, such as main (or "system") memory 110. Regardless of the exact configuration, GPU 130 may receive graphical information from processor 102 via a bus 108, and transform the graphical information into pixel data (e.g., a 3D image) to be displayed on one or more remote nodes 160.

Host 100 may also include a network interface card 152, allowing host 100 to communicate with remote nodes 160 via a network 150. Network interface card 152 may be any suitable network interface card, network adapter, or other type of network device, the exact configuration of which may depend on the type of network 150. Network 150 may be any type of network, including any combination of an Ethernet-based local area network (LAN), wide area network (WAN), a wireless LAN, and the Internet.

Host 100 is shown comprising at least one processor 102, which obtains instructions and data via bus 108 from main memory 110. Processor 102 could be any processor adapted to support the methods of the invention. Main memory 110 is any memory sufficiently large to hold the necessary programs and data structures. Main memory 110 could be one or a combination of memory devices, including Random Access Memory (RAM), nonvolatile or backup memory, (e.g., programmable or Flash memories, read-only memories, etc.). As illustrated, the computer system may also include an operating system 112 (e.g., which may be loaded into main memory 110). The operating system 112 is the software used for managing the operation of host 100. Examples of the operating system 112 include Microsoft Windows®, UNIX®, Apple OS X, and the like. Main memory 110 further includes one or more device drivers 114 and one or more one or more application programs 116. Device drivers 114 generally provide an interface between application programs 116 and devices, such as GPU 130 and network interface card 152.

As illustrated, application programs 116 may include a remote GUI manager 118, which is a software program product comprising a plurality of instructions that are resident at various times in various memory and storage devices in host 100. When read and executed by one or more processors 102 in host 100, remote GUI manager 118 causes host 100 to perform operations embodying various aspects of the invention. Remote GUI manager 118 is generally configured to interact (e.g., through various system calls, subroutine calls, drivers, etc.) with other software and hardware components of host 100 (e.g., operating system 112, device drivers 114, GPU 130, and the network interface card 152) to prepare and send 3D graphical images to remote nodes 160 for display as part of a graphical user interface (GUI), a "remote GUI." The term remote GUI generally refers to the display of graphical images (referred to hereinafter as GUI data) on a remote node 160 and typically (although not necessarily) involves information transmitted from remote node 160 back to host 100. In some instances, information transmitted back to host 100 may be used to control the content of the images sent to remote nodes 160.

Figure 2A:
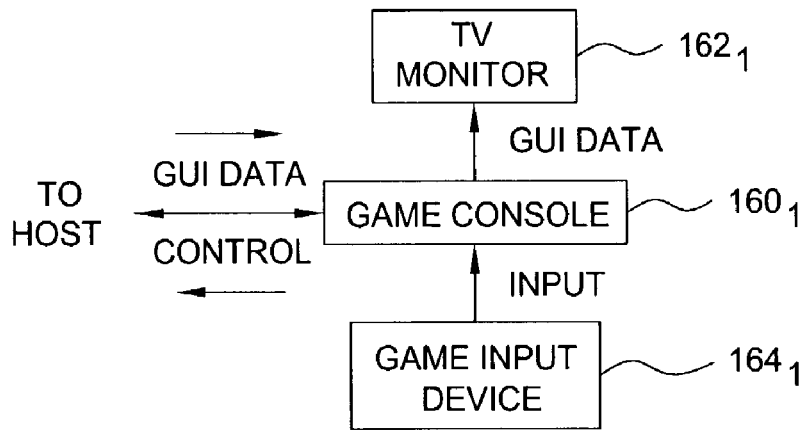
FIGS. 2A–2C illustrate exemplary remote nodes in accordance with one or more aspects of the invention.
Figure 2B:
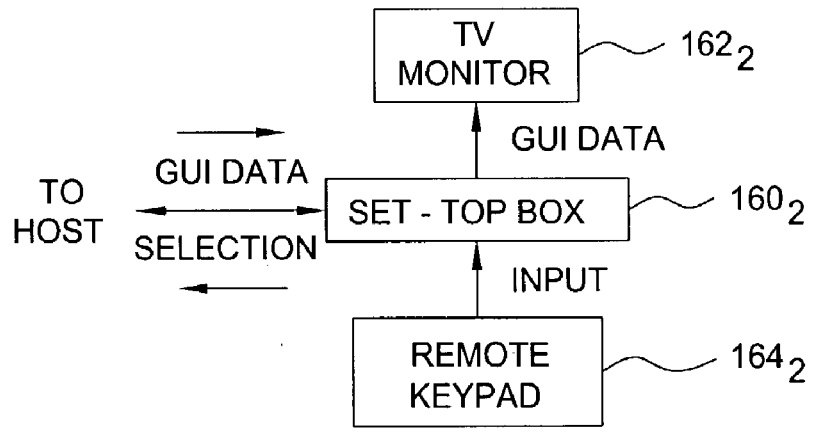
Figure 2C:
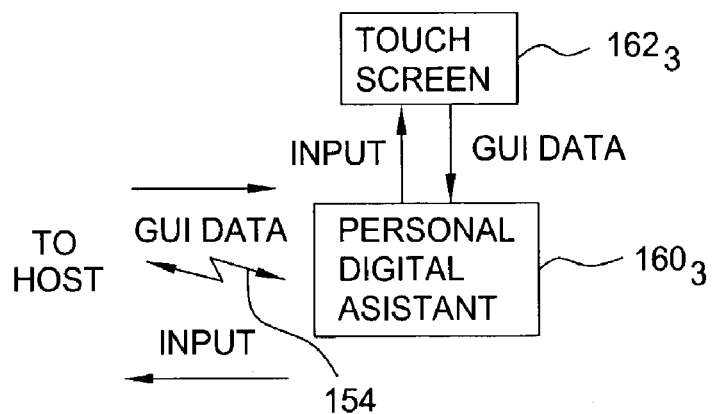

As illustrated in FIGS. 2A–2C, examples of remote nodes 160 may include a variety of different type networked devices. For example, as illustrated in FIG. 2A, a remote node may be a game console $160_1$ that receives graphical images from host 100 and displays the images on a television monitor $162_1$. The game console $160_1$ may also transmit control input from a game input device $164_1$ (e.g., a joystick, steering wheel, etc.) back to host 100. For some applications, depending on network latency, the GUI data sent by remote GUI manager 118 may be determined based on the control input, for example, in an effort to alter an animated game scene in real time.

As illustrated in FIG. 2B, a remote node may be a set-top box $160_2$ configured to receive and display GUI data (e.g., a stream of images from a movie) to a television monitor $162_2$, for example, as part of a video-on-demand (VOD) service. The set-top box $160_2$ may also be configured to send user selections, entered via an input device $164_2$ (e.g., a remote control or keypad) back to host 100, for example, to control playback (pause, play, advance, rewind, etc.) or select content (e.g., a movie title, broadcast event, etc.). As another example, a remote node may be a handheld computing device, such as a personal digital assistant (PDA) $160_3$. PDA $160_3$ may include a touch screen display $162_3$ that may be used to display high quality 3D images received from host 100 via a wireless network connection 154. Touch screen display $162_3$ may also be used to send input from the PDA $160_3$ back to host 100. While not shown, for some embodiments, rather than a full function CPU or GPU, a remote node 160 may include a relatively inexpensive digital signal processor (DSP) configured to receive a rendered image from host 100 and output a signal compatible with a display 164, such as a standard television.

Regardless of the particular embodiment of remote nodes 160, as previously described, by performing the 3D graphics processing at host 100, the cost and complexity of remote nodes 160 may be limited. It should also be noted that, in a system with multiple remote nodes 160, the contents of different sources may be displayed on different ones of the multiple remote nodes 160. For example, in a multi-user gaming environment, host 100 may send images to multiple game consoles $160_2$ that represent the same game scene from corresponding different user's points of view. It should also be noted that some systems may include a combination of different types of remote nodes 160. As an example, the same host 100 may process (e.g., scale and convert) and send gaming images to one or more game consoles $160_1$, and process and send movie images to one or more set-top boxes $160_2$.

Figure 3:
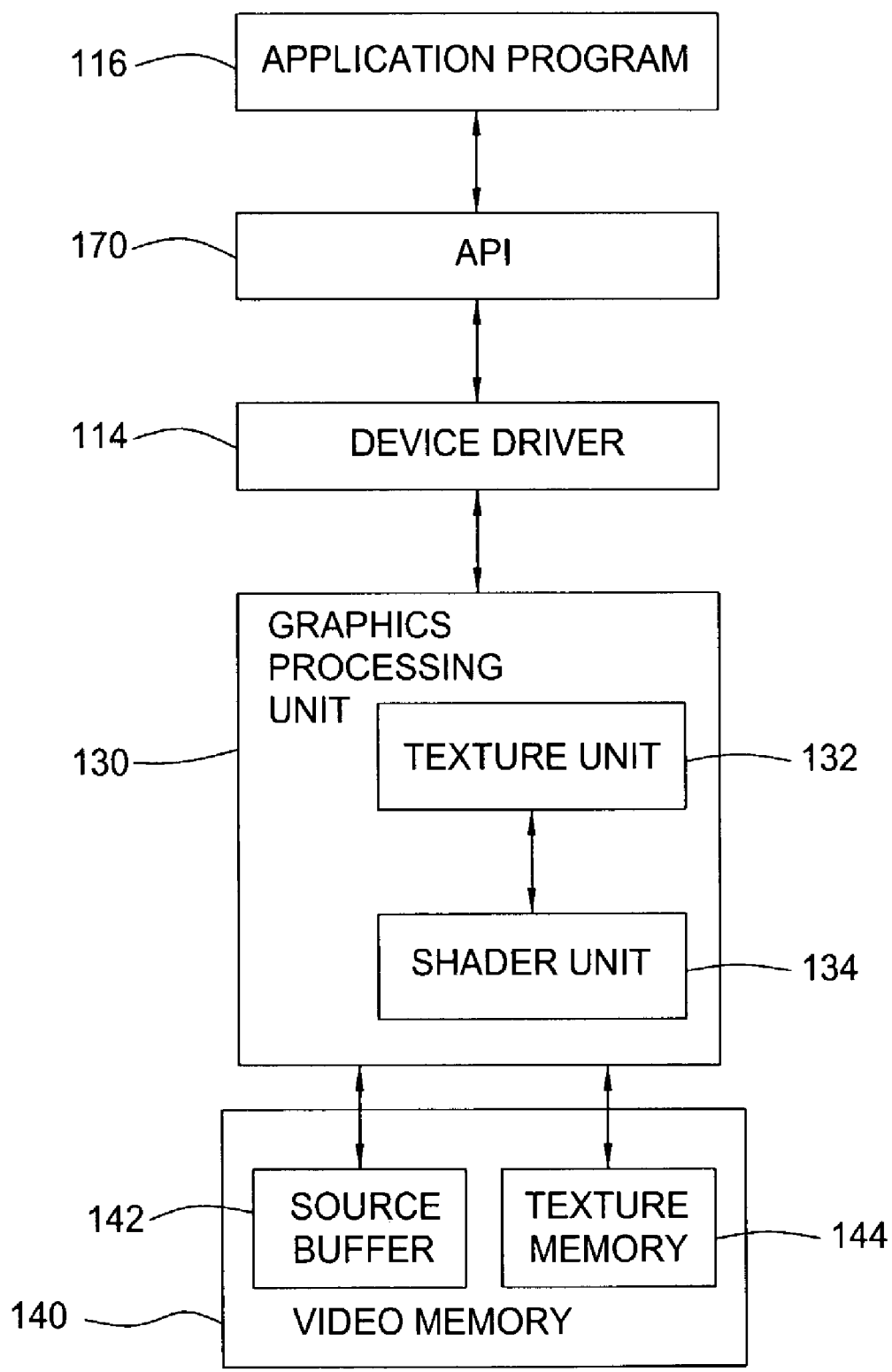
FIG. 3 illustrates an exemplary graphics processing unit (GPU) in accordance with one or more aspects of the invention.

FIG. 3 illustrates a schematic block diagram of one embodiment of a GPU 130 that may be used to implement one or more aspects of the invention. As illustrated, an application program 116 may interface with GPU 130 via an application program interface (API) 170 directly or via a driver 114. In general, API 170 may include a set of functions and routines developed specifically to interact with GPU 130 directly or via driver 114. API 170 may be any of a variety of APIs, including well-known APIs, such as OpenGL® or Direct3D®, a proprietary API, or any suitable combination thereof. Specific examples of API routines will be described in greater detail below. In general, driver 114 acts like a translator between API 170, accepting generic commands and translating them into specialized "low level" commands recognized by GPU 130.

As an illustrative example, application program 116 may generate a 3D graphic image to be displayed on a display (e.g., a display of the host computer 100 of FIG. 1 or a remote node 160). Application program 116 may pass the graphic image to GPU 130 via API 170 and driver 114 for processing. GPU 130 may process the graphic image and output a rendered image as a 2D set of pixels to a source/frame buffer 142 where it may be accessed for display.

According to some aspects of the invention, GPU 130 may be a pipelined GPU, such as the GeForce® line of pipelined GPUs available from nVidia Corporation of Santa Clara, Calif. As illustrated in FIG. 3, GPU 130 may include at least one texture unit 132 and at least one shader unit 134, which may be separate components or may each be part of a single integrated component of GPU 130. In general, texture unit 132 may be configured to receive texture coordinates for individual pixel fragments, access texture data from texture maps stored in a texture memory 144, and perform various levels of filtering on the texture data. Texture memory 144 may be part of a same memory used for the source buffer 142 (e.g., video memory 140), or may be separate memory dedicated to texture unit 132. Shader unit 134 may access texture data from the texture memory 144, combine the texture data and perform additional filtering operations to generate a final value for a pixel that is eventually written to the source buffer 142.

For some embodiments, shader unit 134 may be designed as a programmable engine, for example, that may execute a set of instructions (which may be referred to as a "pixel program"), which may be passed to GPU 130 through API 170. A programmable shader unit provides a great deal of flexibility in performing operations on data stored as texture data. In some cases, certain aspects of the invention may be implemented as a pixel program executed in GPU 130. For example, as will be described in greater detail below, GPU 130 may be configured with a pixel program, via remote GUI manager 118, to scale and compress graphic images (e.g., the contents of one or more source windows) for display on one or more remote nodes 160.

GENERATING GUI DATA IN THE GPU

Figure 4:
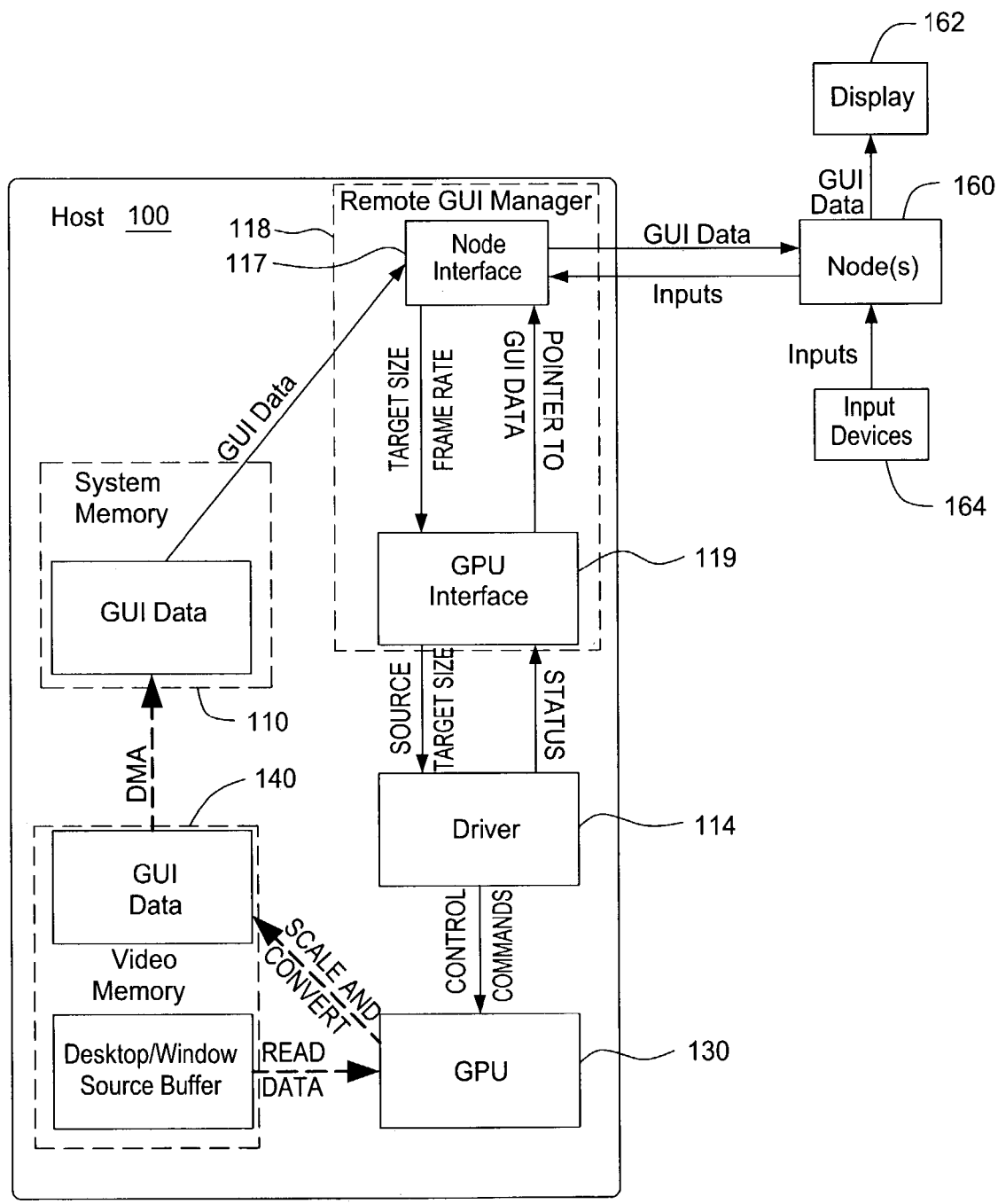
FIG. 4 is a relational view of components in accordance with one or more aspects of the invention.

FIG. 4 is a relational view of remote GUI manager 118 and a GPU 130 utilized in a host 100 in accordance with aspects of the invention. As illustrated, remote GUI manager 118 may be implemented as distinct functional software components, such as a node interface 117 and a GPU interface 119. Of course, this illustrative separation of functions is merely intended to promote understanding and the separation (or integration) of functions among software components will vary with different implementations. As illustrated, node interface 117 is generally configured to communicate with remote nodes 160, while GPU interface 119 is generally configured to communicate with GPU 130. As will be described below, node interface 117 and GPU interface 119 may pass various information between each other.

Figure 5:
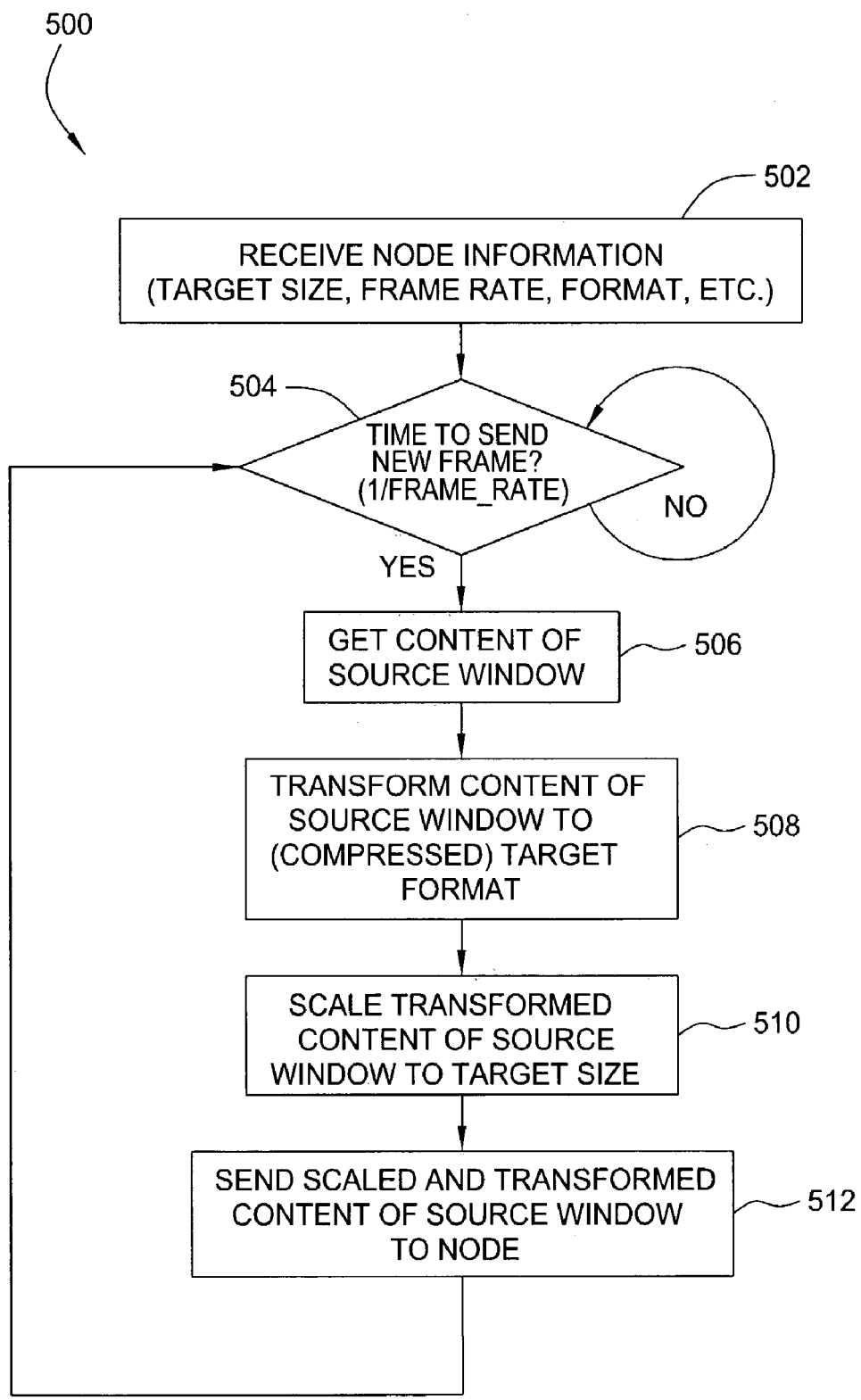
FIG. 5 illustrates exemplary operations for displaying a 3D image on a remote node in accordance with one or more aspects of the invention.

Operation of host 100 shown in FIG. 4 may be described with reference to FIG. 5, which illustrates exemplary operations 500 for displaying a 3D image (in this example, stored as the contents of a source window or desktop) on a remote node 160 that may be performed by the various components of host 100. It should be noted, however, that the components of host 100 are not limited to performing the operations 500 and may be configured to perform other operations. Further, the operations 500 may be performed by components other than those illustrated in host 100 of FIG. 4. While only one node 160 is shown, it should be understood that similar operations 500 may be performed to process and send rendered 3D images to multiple nodes 160.

Operations 500 begin, at step 502, by receiving information from a remote node 160, for example, sent in response to user input generated by one or more input devices 164 (e.g., game input devices, remote controls, etc.). As illustrated in FIG. 4, this node information may be received by node interface 117. The node information may include any suitable type information that specifies how host 100 should process an image to be sent to the node 160 for display. For example, the node information may include a desired frame rate (e.g., 24 fps, 30 fps, 60 fps, etc.), a screen size of remote node (e.g., indicating a horizontal and vertical number of pixels), and a desired image format. As illustrated, the node information may be passed from node interface 117 to GPU interface 119, which may use the node information to request GUI data (e.g., of the specified image format) from GPU 130 at the appropriate time.

For example, as illustrated in step 504, GPU interface 119 may periodically request a new "frame" of GUI data, with a period between frames determined by the frame rate (e.g., T=1/frame_rate), in an effort to ensure the specified frame rate is achieved. If it is time to send a new frame, GPU interface 119 may request the frame of GUI data from GPU 130. As previously described, GPU 130 may be configured perform the format conversion (e.g., compression) and scaling of the source contents. For example, as illustrated, GPU interface 119 may pass GPU 130 an identification of the source window and the target size (i.e., the screen size of the target node), and GPU 130 may automatically perform the operations 506–510 to convert and scale the contents of the source window.

At step 506, the contents of the source window are obtained. For example, as illustrated, GPU 130 may read the contents of the source window, for example stored in a first image format (e.g., RGB, RGB32, etc.), from a source buffer in video memory 140, such as desktop/window primary or back-end frame buffer. As previously described, the contents of the source window may be stored (or captured) as a texture data (e.g., in texture memory 144 shown in FIG. 3) to be used as input for image format transformation.

Figure 6:
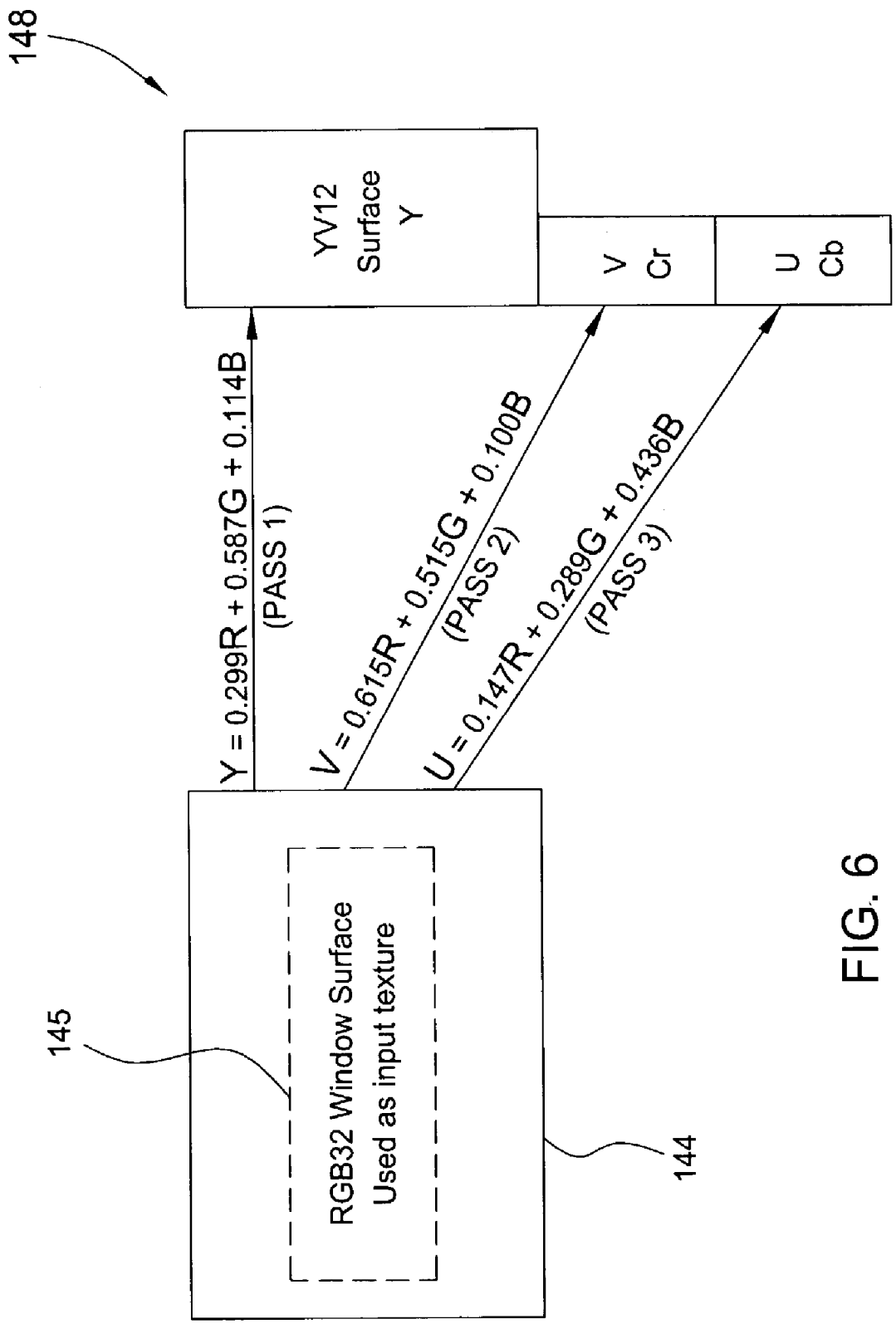
FIG. 6 illustrates one example of a transform that may be used to convert a 3D image from a first image format to a second image format in accordance with one or more aspects of the invention.

At step 508, the contents of the source window are transformed into the target format. For example, GPU 130 may transform the source window contents into the target format with one or more passes through a graphics pipeline of GPU 130, using the source window contents (previously captured as texture data) as input. For example, FIG. 6 illustrates one example of a transformation of an image (as shown, as the contents of a source window 145 in a buffer 144) stored in RGB32 format (32-bit) to a compressed YV12 format (12-bit). The YV12 format includes three components (Y, V, and U, also known as Y, Cr and Cb) that may each be calculated based on the three values (R, G, and B) of the RGB32 format. As illustrated, the U and V components generally each occupy 25% of the space of the Y component because the U and V spaces are typically sampled every other pixel in a line and every other line (e.g., one sample of U and V is used for four pixels).

GPU 130 may be configured to generate each of the three YV12 components on successive passes through a pipeline of GPU 130. For example, GPU 130 may generate the Y component on a first pass, the V component on a second pass, and the U component on a third pass. Since each of the Y, V, and U components may be generated from the same RGB input (e.g., captured as texture data), however, the order of the passes may be arbitrarily assigned. Of course, minor variations to the illustrated values may be made, for example, to make adjustments to luma (Y) or color (U,V), for various desired effects or compensation. Further, for other implementations, GPU 130 may be configured to perform the transformations in parallel. Still further, while the operations are typically performed sequentially for each pixel, for some implementation, GPU 130 may be configured to process multiple pixels in parallel. For example, some implementations of GPU 130 may include multiple pipelines or other suitable hardware components capable of performing the conversions in parallel.

Referring back to FIG. 5, at step 510, the transformed contents of the source window are scaled to fit the target (screen) size of remote node 160. While illustrated as occurring subsequent to transforming the contents to the second image format, the scaling may also be performed prior to the transforming. In either case, the source window size and target screen size may be any standard or non-standard sizes. For example, as previously described, the contents of a 1280×1024 window may be scaled to fit a 720×480 screen size of a remote node. While the target screen size (i.e., in number of pixels, not physical dimensions) will typically be smaller than the source window, for some applications, it may be the same size or greater than the source window. In such applications, advantages may still be gained by performing the 3D rendering and image format conversion at host 100, as described herein.

At step 512, the (optionally scaled and) transformed contents of the source window are sent to remote node 160. As illustrated in FIG. 4, if the format conversion and scaling are performed in GPU 130, the scaled and converted content (labeled GUI data) may initially reside in video memory 140. Therefore, the GUI data may be transferred to system memory 110 via a direct memory access (DMA) process. As used herein, DMA generally describes a capability provided by some bus architectures that allows data to be sent directly from an attached device (such as GPU 130 or video memory 140) to system memory 110, with little or no involvement of the CPU, thus speeding up overall operation. As illustrated, GPU interface 119 may pass a pointer to the GPU data (e.g., returned by an API function call, as described below) to node interface 117. Using this pointer, node interface 117 may access the GUI data from system memory 110 and send the GUI data out to remote node (e.g., via the appropriate network protocol).

Remote node 160 is generally configured to receive, decode, and display the content on the display 162. Thus, a remote node 160 of relatively limited resources (e.g., a set-top box, game console, or PDA) may be able to display a fully rendered 3D image. In particular, if a display 162 is a standard television that accepts YUV signals, decoding YV12 content to YUV for display may require relatively limited resources, such as a properly configured DSP. As illustrated, the operations 506–512 may be repeated each time a new frame of source window contents is to be sent to the node 160 (e.g., according to a specified frame rate). The operations may be repeated, for example, until receiving input from a user of the node 160 (e.g, via an input device 164) to cease the operations.

Of course, the YV12 image format is merely illustrative of one type of compressed format that may be utilized to an advantage. It is anticipated that, particularly as GPU technology continues to advance, a GPU 130 may be configured to convert the contents of the source window into other types of possibly more advanced compressed formats, such as MPEG2, or any other suitable compressed format presently known or to be developed. Further, rather than performing the format conversion and scaling operations in GPU 130, any or both of the operations may be performed by separate hardware components, such as an application specific integrated circuit (ASIC) or a field programmable gate array (FPGA).

APPLICATION PROGRAMMING INTERFACE

As previously described with reference to FIG. 3, however, if GPU 130 is utilized to perform any or both of the format conversion or scaling operations, an application programming interface (API) 170 may provide an interface for remote GUI manager 118 to control GPU 130, via a driver 114, in order to process the contents of a source window for display on remote node 160. For example, remote GUI manager 118 may simply pass an identification of the location of a graphic image (e.g., a source window ID), a target size, and the desired format to GPU 130 via a call to an API function.

TABLE I below, illustrates an exemplary data structure that may be passed via a call to an API function in accordance with aspects of the invention.

TABLE I

EXAPLE API DATA STRUCTURE

```
001 typedef struct {
002    unsigned long dwSize;        // sizeof(NVS2VDATATYPE)
003    NVS2VCOMMAND dwCmd;
004 //source data
005    unsigned long dwIndex;
006    unsigned long dwDevice;
007 // destination data
008    unsigned long dwDstWidth;    // in pixels
009    unsigned long dwDstHeight;   // in lines
010    NVS2VSURFTYPE dwDstType;
011    unsigned long dwDstPitch;    // in bytes
012    void *fpDst;
013    } NVS2VDATATYPE, *LPNVS2VDATATYPE;
```

Parameter dwCmd (shown in line 3) may specify a command, such as open/close a remote GUI connection, transfer GUI data, etc. For example, an open command issued via API 170 may allow driver 114 to allocate necessary resources, based on target node screen size, as specified by dwDstWidth and dwDstHeight parameters (shown in lines 8 and 9). DwIndex and dwDevice parameters (shown in lines 5 and 6) may indicate a source window (the contents of which are) to be displayed on a remote node and may be used to generate a source ID to pass to driver 114.

API function may also allow a format for the GUI data to be specified. For example, the dwDstType parameter (shown in line 10) may specify the GUI data format (e.g., YV12, MPEG2, etc.). Of course, as an alternative, separate API functions may be generated, specific to each type of target format (e.g., one to generate GUI data in YV12 format, another to generate GUI data in MPEG2 format, etc.). In either case, the format of the source contents (e.g., RGB, RGB32, etc.) may be readily identified from the source ID (e.g., as indicated by the dwDevice parameter) and need not be explicitly specified. The fpDst parameter (shown in line 12) may be a pointer, set by the API function, to the location of the (scaled and compressed) GUI data in system memory (which, as described above, may be passed back to the node manager 119). The dwDstPitch parameter (shown in line 12) may indicate the actual pitch used for the buffer which may be used to locate the buffer at an alignment acceptable to GPU 130.

According to some aspects, a driver 114 may communicate to a GPU 130 via one or more API functions internal to the driver 114 (e.g., not directly accessible via an application program). For example, TABLE II below, shows an exemplary API function that may be called by driver 114, to convert a source window (e.g., identified by the dwDevice parameter described above) from an RGB32 format to YV12.

TABLE II

EXAMPLE API FUNCTION 001 nvRGB32toYV12 (dwSrcOffset, dwSrcPitch, dwSrcX, dwSrcY,
002    dwSrcWidth, dwSrcHeight,
003    dwDstOffset, dwDstPitch, dwDstX, dwDstY,
004    dwDstWidth, dwDstHeight);

The parameters in line 1 (dwSrcOffset, dwSrcPitch, dwSrcX, dwSrcY) may indicate a location of the source window (e.g., within video memory 140) and may be generated, for example, by driver 114 based on the dwDevice parameter. For example, the dwSrcOffset may specify an offset address within a frame buffer (e.g., in video memory 140) that identifies the location of the source window (or other type image). The parameters in line 2 (dwSrcWidth and dwSrcHeight) may indicate the size of the source image. The parameters in lines 3 and 4 (dwDstOffset, dwDstPitch, dwDstX, dwDstY, dwDstWidth, dwDstHeight) may serve similar functions to the corresponding source parameters described above, for example, to indicate a size and where to locate the results (e.g., the scaled and converted image). For example, the parameters dwDstX and dwDstY may serve, for example, to locate the converted GUI data in an area of the system memory reserved for a specific remote node.

Of course, the parameters described above with reference to TABLES I and II are illustrative only and various other parameters may also be included to support additional or different functionality. In general, any suitable set of API functions utilizing any suitable data structures may be utilized. Further, as previously described, for some embodiments, remote GUI manager 118 may interface directly with driver 114 or GPU 130 (e.g., without an API).

ADDITIONAL COMPRESSION

As previously described, aspects of the invention may achieve a degree of compression from both converting a graphic image to a compressed format, as well as (optionally) scaling the converted image to fit a smaller (fewer pixels) screen window on a remote node. Additional compression may also be achieved through other compression techniques, such as run length encoding. For example, if GUI data to be sent to a remote node 160 contains several byte lengths of the same data, the data may be transmitted followed by an indication of the number of times the data is repeated.

Figure 7:
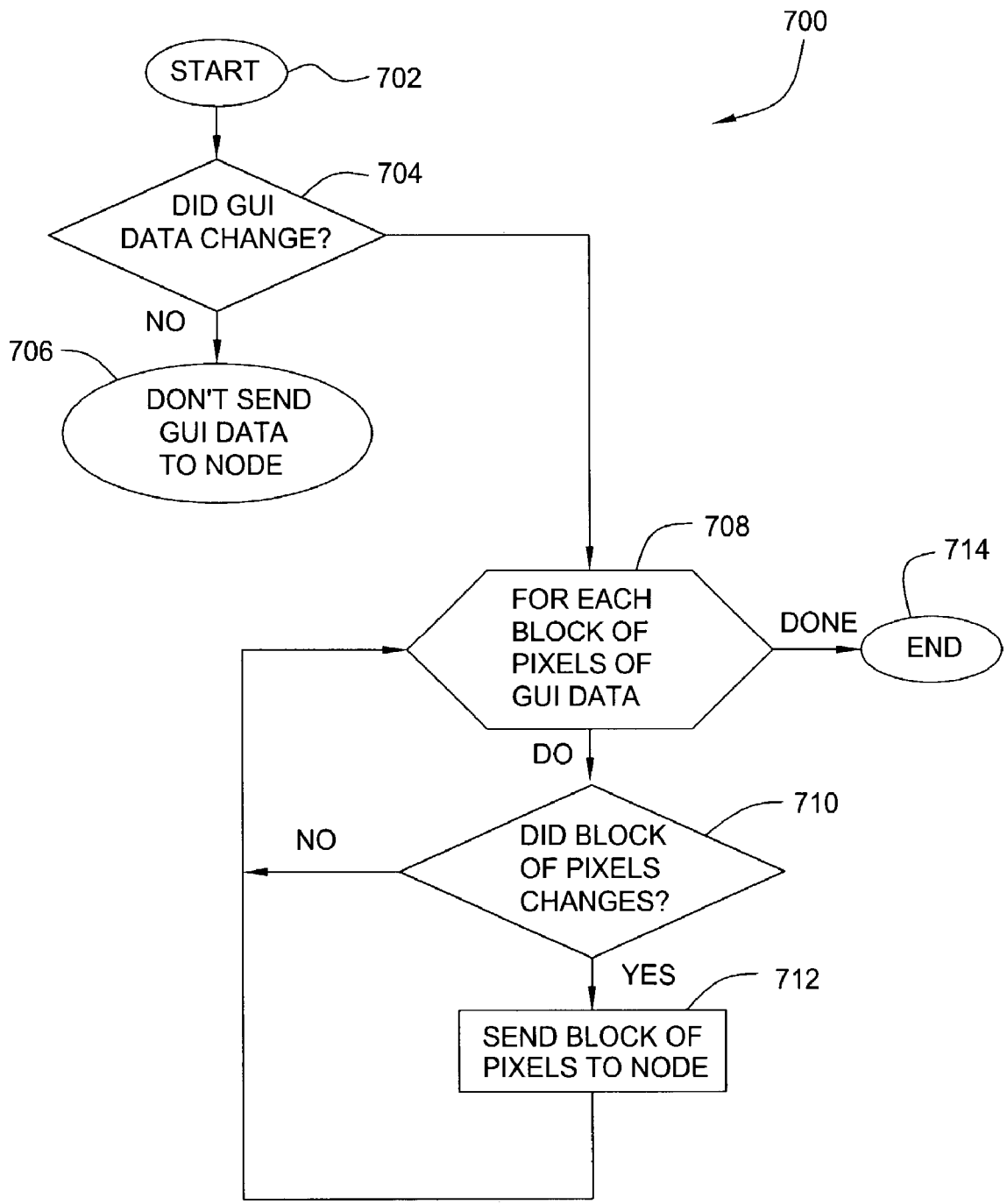
FIG. 7 illustrates exemplary operations for reducing network bandwidth in accordance with one or more aspects of the invention.

According to other aspects, additional compression may also be achieved by examining the content of the GUI data itself, in an effort to transmit only portions of a 3D image that have changed relative to a previously sent 3D image. For example, FIG. 7 illustrates exemplary operations 700 that may be performed to further reduce the amount of data transmitted from host 100 to a remote node 160. Operations 700 may be performed, for example, in GPU 130 before or after conversion and scaling, or by node interface 117 prior to sending the converted image to remote node 160. In either case, operations 700 assume previously transmitted GUI data (i.e., a previously sent image either before or after image transformation or scaling) has been stored for comparison, for example, in video memory 140 or system memory 110.

Operations 700 begin at step 702 and, at step 704, a determination is made as to whether the GUI data (e.g., the source window content) has changed relative to previously transmitted GUI data. Any suitable technique may be used to compare current GUI data to the previous GUI data for this determination. If it is determined the GUI data has not changed, the GUI data is not sent to the node 160. If the determination is made in GPU 130, GPU 130 may return (e.g., via an API or driver 114) to remote GUI manager 118 an indication the GUI data has not changed. Remote GUI manager 118 may optionally send an indication to remote node 160 that the data has not changed, for example, to ensure the remote node 160 does not trigger a time out (e.g., thinking communication with host 100 has been lost).

Even if the GUI data has changed, as determined at step 702, however, it is possible that only a small portion has changed. For example, in many applications, the amount of change between successive frames (e.g., for a DVD movie or video game) is often relatively small until an actual change of scene occurs. For such applications, by sending only portions of the GUI data that have changed, the amount of network bandwidth required between host 100 and node 160 may be significantly reduced.

Therefore, processing may proceed to step 708 to determine which portions of the GUI data has changed. As illustrated, a loop of operations 710–712 are performed for blocks of pixels of the GUI data. At step 710, a determination is made as to whether a chosen block (e.g., a "macro block" in MPEG terms) of pixels has changed. If the chosen block of pixels has changed relative to a corresponding block of pixels from previously sent GUI data, that block of pixels is sent to the node, at step 712. Of course, rather than actually send the block of pixels within the loop, the block of pixels may be identified as one to be sent later. If the chosen block of pixels has not changed, processing proceeds back step 708 to choose the next block of pixels without sending the block of pixels (or by identifying the block of pixels as unchanged).

The size of the blocks of pixels (which may be, for example, N×N or N×M blocks of pixels, wherein N and M are integers) examined for change may be any suitable size and may be determined, for example, in accordance with the number of bytes that can be transmitted in a network packet. For example, the size of the block of pixels examined may be chosen to ensure the block can be transmitted in a single network packet, in an effort to optimize network transmissions. Once the operations 710–712 have been performed for each block of pixels, the operations 700 are terminated at step 714. If the blocks of pixels that have changed were merely identified (and not sent, at step 712) the blocks of pixels identified as having changed, may be subsequently sent.

Aspects of the invention may provide methods, apparatus, and systems for displaying a fully rendered three-dimensional (3D) image on a remote node. The 3D image may be fully rendered on a host system using advance techniques that may be unachievable by remote node alone, due to limited resources. After rendering the image, the host system may convert the rendered image from a first image format to a second (compressed) format suitable for processing by remote node, and scale the image to a screen size specified for remote node. Accordingly, aspects of the invention may be utilized to reduce the cost of remote nodes used in a wide variety of applications, such as video-on-demand, videoconferencing, interactive gaming, and the like.

While the foregoing is directed to embodiments of the invention, other and further embodiments of the invention may be devised without departing from the basic scope thereof, and the scope thereof is determined by the claims that follow. In the claims, the listed order of method steps do not imply any order to the performance of the steps, unless specifically stated in the claim.

The invention claimed is:

1. A method for preparing a three dimensional (3D) computer-generated image for display on a remote device, comprising:
   rendering, with a three-dimensional (3D) graphics processing unit that includes a texture unit and a shader unit, the 3D computer-generated images in a first image format to produce a rendered image, wherein the rendered image comprises a two dimensional (2D) set of pixels;
   storing the rendered image as texture data in a video memory that is directly coupled to the 3D graphics processing unit;
   reading the rendered image from the video memory using texture coordinates for individual pixel fragments without copying the rendered image from the video memory to a system memory in order to convert the rendered image into texture data;
   transforming, with the three-dimensional (3D) graphics processing unit, the rendered images into a second image format to produce a transformed image, the second image format utilizing fewer data bits per pixel than the first image format;
   storing the transformed image in the video memory;
   transferring the transformed image from the video memory to the system memory using a direct memory access process;
   reading the transformed image from the system memory; and
   sending the transformed image to the remote device through a network interface.

2. The method of claim 1, wherein the transforming of the rendered image into the second image format comprises:
   generating one or more components of the second image format based on the texture data.

3. The method of claim 1, wherein the generating of the one or more components of the second image format comprises multiple passes through a pipeline of the graphics processing unit, wherein a different one of the one or more components is generated each pass.

4. The method of claim 1, further comprising scaling the rendered image from a first size to a second size, wherein the second size is defined by a smaller number of pixels than the first size.

5. The method of claim 4, wherein the scaling is performed by the graphics processing unit.

6. The method of claim 1, further comprising periodically repeating the rendering, transforming, and sending according to a specified frame rate.

7. The method of claim 1, wherein the sending is performed by a remote graphical user interface manager.

8. A method for preparing a plurality of three dimensional (3D) computer-generated images for display on a plurality of remote devices, comprising:
   rendering, with a three-dimensional (3D) graphics processing unit that includes a texture unit and a shader unit, the plurality of the three dimensional (3D) computer-generated images in a first image format to produce rendered images, wherein each one of the rendered images comprises a two dimensional (2D) set of pixels;
   storing the rendered images as texture data in a video memory that is directly coupled to the 3D graphics processing unit;
   reading the rendered images from the video memory using texture coordinates for individual pixel fragments without copying the rendered images from the video memory to a system memory in order to convert the rendered images into texture data;
   transforming, with the three-dimensional (3D) graphics processing unit, the rendered images into a second image format to produce a plurality of transformed images, the second image format utilizing fewer data bits per pixel than the first image format;
   storing the transformed images in the video memory;
   transferring the transformed images from the video memory to the system memory using a direct memory access process;
   reading the transformed images from the system memory; and
   sending the transformed images to the remote devices through a network interface.

9. The method of claim 8, wherein at least two of the remote devices are game consoles.

10. The method of claim 9, wherein:
    a first one of the transformed images, sent to a first game console, corresponds to a view of a game scene from a perspective of a user of the first game console; and
    a second one of the transformed images, sent to a second game console, corresponds to the game scene from a perspective of a user of the second game console.

11. The method of claim 8, further comprising:
    receiving input from at least one of the remote devices through the network interface; and
    selecting the plurality of the three dimensional (3D) computer-generated images based on the received input.

12. The method of claim 11, wherein the input received specifies a user selection to control content or to control playback of the plurality of the three dimensional (3D) computer-generated images.

13. A host computer system for preparing a three-dimensional (3D) computer-generated image for display on a remote device comprising:
    a video memory configured to store a rendered image and a transformed image;
    a graphics processing unit coupled to the video memory and configured to render the 3D computer-generated image to produce the rendered image comprised of a two dimensional (2D) set of pixels, store the rendered image in the video memory as texture data in a first image format, read the rendered image from the video memory using texture coordinates for individual pixel fragments, transform the rendered image into a second image format to produce the transformed image, wherein the second image format utilizes fewer data bits per pixel than the first image format, and store the transformed image in the video memory without copying the rendered image from the video memory a system memory in order to convert the rendered image into texture data;

a system memory configured to store the transformed image upon being transferred from the video memory; and a remote graphics user interface (GUI) manager configured to receive a pointer to the transformed image stored in the system memory and to output the transformed image to the remote device.

14. The host computer system of claim 13, wherein the graphics processing unit is configured to transform the rendered image into the second image format with multiple iterative operations using the rendered image as input.

15. The host computer system of claim 13, wherein the graphics processing unit is further configured to receive a set of programming instructions and execute the set of programming instructions to transform the rendered image into the second image format.

16. The host computer system of claim 13, wherein the graphics processing unit is configured to scale the rendered image from a first size to a second size that corresponds to fewer pixels than the first size.

17. The host computer system of claim 16, wherein the second size is a screen size of the remote device.

18. The host computer system of claim 13, wherein the graphics processing unit is configured to retrieve the rendered image from one of a primary frame buffer or a back-end frame buffer.

19. The host computer system of claim 13, wherein the host computer system is coupled to the remote device via a network and is configured to send the transformed images to the remote device via the network, wherein the remote device has a corresponding display device.

20. The host computer system of claim 19, wherein the remote device is a handheld computing device coupled to the host computer system via a wireless network connection.

21. The host computer system of claim 19, wherein the remote device is a set-top box with a television as the corresponding display device.

22. The host computer system of claim 21, wherein the remote device is a game console with an input device.

23. The host computer system of claim 22, wherein the host computer system is configured to receive input from the input device of the game console and select the rendered image to be transformed and sent to the game console based on the received input.

24. The host computer system of claim 19, wherein the remote device comprises a digital signal processor configured to transform the transformed image received from the host computer system in the second image format into a format compatible with the corresponding display device.

25. The host computer system of claim 13, wherein the second image format is specified by an application programming interface for the 3D graphics processing unit.

26. A computer-readable medium encoded with a program which, when executed by a processor, performs operations for preparing a plurality of three dimensional (3D) computer-generated images for display on one or more remote devices, comprising:

rendering, with a three-dimensional (3D) graphics processing unit that includes a texture unit and a shader unit, the plurality of the three dimensional (3D) computer-generated images in a first image format to produce rendered images, wherein each one of the rendered images comprises a two dimensional (2D) set of pixels;

storing the rendered images as texture data in a video memory that is directly coupled to the 3D graphics processing unit;

reading the rendered images from the video memory using texture coordinates for individual pixel fragments without copying the rendered images from the video memory to a system memory in order to convert the rendered images into texture data;

transforming, with the three-dimensional (3D) graphics processing unit, the rendered images into a second image format to produce a plurality of transformed images, the second image format utilizing fewer data bits per pixel than the first image format;

storing the transformed images in the video memory;

transferring the transformed images from the video memory to the system memory using a direct memory access process;

reading the transformed images from the system memory; and sending the transformed images to the remote devices through a network interface.

27. The computer-readable medium of claim 26, wherein transforming the rendered images into a second image format comprises communicating with the 3D graphics processing unit via one or more application programming interface (API) functions.

28. The computer-readable medium of claim 26, wherein communicating with the graphics processing unit via one or more application programming interface (API) functions comprises specifying a screen size of the remote devices and the operations further comprise scaling, by the 3D graphics processing unit, the rendered images to the specified screen size of the remote devices.

29. The computer-readable medium of claim 26, wherein communicating with the 3D graphics processing unit via one or more application programming interface (API) functions comprises specifying the second image format.

* * * * *

UNITED STATES PATENT AND TRADEMARK OFFICE
CERTIFICATE OF CORRECTION

PATENT NO.         : 7,173,635 B2
APPLICATION NO. : 10/400046
DATED                  : February 6, 2007
INVENTOR(S)        : Amann et al.

It is certified that error appears in the above-identified patent and that said Letters Patent is hereby corrected as shown below:

In column 13, line 25, replace "images" with --image--

In column 13, line 38, replace "images" with --image--

In column 13, line 39, remove "to produce a transformed image"

In column 13, line 54, replace "1" with --2--

In column 14, lines 23-24, remove "to produce a plurality of transformed images"

In column 15, line 3, replace "memory a" with --memory to a --

In column 16, line 21, replace "images" with --image--

In column 16, line 23, replace "images" with --image--

In column 16, lines 26-27, remove "to produce a plurality of transformed images"

Signed and Sealed this

Twenty-second Day of May, 2007

JON W. DUDAS
*Director of the United States Patent and Trademark Office*